(12) United States Patent
Lee et al.

(10) Patent No.: US 11,137,363 B2
(45) Date of Patent: Oct. 5, 2021

(54) COMPOSITE SENSOR FOR SENSING GAS AND DUST BY USING SINGLE HEAT SOURCE

(71) Applicant: LG ELECTRONICS INC., Seoul (KR)

(72) Inventors: Kangsun Lee, Seoul (KR); Chaedeok Lee, Seoul (KR); Seonghyok Kim, Seoul (KR); Seonghak Moon, Seoul (KR); Kangmin Kim, Seoul (KR); Hyekyoung Seo, Seoul (KR); Oedong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 16/313,355

(22) PCT Filed: Aug. 24, 2016

(86) PCT No.: PCT/KR2016/009397
§ 371 (c)(1),
(2) Date: Dec. 26, 2018

(87) PCT Pub. No.: WO2018/004060
PCT Pub. Date: Jan. 4, 2018

(65) Prior Publication Data
US 2019/0162685 A1  May 30, 2019

(30) Foreign Application Priority Data
Jun. 29, 2016  (KR) .......... 10-2016-0081484

(51) Int. Cl.
*G01N 25/20* (2006.01)
*G01N 21/94* (2006.01)
(Continued)

(52) U.S. Cl.
CPC ............ *G01N 25/20* (2013.01); *G01N 21/53* (2013.01); *G01N 21/61* (2013.01); *G01N 21/94* (2013.01);
(Continued)

(58) Field of Classification Search
CPC ........ G01N 25/20; G01N 25/32; G01N 25/46; G01N 21/53; G01N 21/94; G01N 21/61; G01N 21/3504; G01N 21/85
See application file for complete search history.

(56) References Cited

U.S. PATENT DOCUMENTS 5,420,440 A * 5/1995 Ketler .................. G01N 21/534
250/573
5,831,537 A * 11/1998 Marman .............. G08B 29/043
340/628
(Continued)

FOREIGN PATENT DOCUMENTS

JP  2006-15197 A   1/2006
JP  2016-102610 A  6/2016
(Continued)

*Primary Examiner* — Nimeshkumar D Patel
*Assistant Examiner* — Gedeon M Kidanu
(74) *Attorney, Agent, or Firm* — Birch, Stewart, Kolasch & Birch LLP

(57) ABSTRACT

A composite sensor for sensing gas and dust by using a single heat source, according to an embodiment of the present invention, can comprise: a base; a gas sensor module comprising a gas sensor and a first light source in a first space; a dust sensor module comprising a dust sensor, a lens, and a second light source in a second space; and a heat transfer wall for transferring heat generated by the first light source to the dust sensor module.

8 Claims, 9 Drawing Sheets

(51) Int. Cl.
  *G01N 25/32* (2006.01)
  *G01N 25/46* (2006.01)
  *G01N 21/53* (2006.01)
  *G01N 21/61* (2006.01)
  *G01N 21/3504* (2014.01)

(52) U.S. Cl.
  CPC ............ *G01N 25/32* (2013.01); *G01N 25/46* (2013.01); *G01N 21/3504* (2013.01)

(56) References Cited

U.S. PATENT DOCUMENTS

| | | | | |
|---|---|---|---|---|
| 7,201,787 | B2* | 4/2007 | Choi | F24F 5/0042 55/471 |
| 7,296,459 | B2* | 11/2007 | Son | F25D 29/00 73/31.02 |
| 10,006,846 | B2* | 6/2018 | Karakaya | G01N 5/02 |
| 10,495,104 | B2* | 12/2019 | Park | B01D 46/002 |
| 10,697,665 | B2* | 6/2020 | Jung | F24F 13/14 |
| 2001/0038338 | A1* | 11/2001 | Kadwell | G08B 17/113 340/630 |
| 2005/0093707 | A1* | 5/2005 | Van Winkle | G08B 29/185 340/630 |
| 2014/0216259 | A1* | 8/2014 | Iwaki | F24F 11/30 96/19 |
| 2015/0077737 | A1* | 3/2015 | Belinsky | G08B 17/107 356/51 |
| 2016/0334320 | A1* | 11/2016 | Cho | H04N 5/2256 |
| 2017/0248153 | A1* | 8/2017 | Park | F24F 13/14 |

FOREIGN PATENT DOCUMENTS

| | | |
|---|---|---|
| KR | 10-2005-0102347 A | 10/2005 |
| WO | WO 2016/078217 A1 | 5/2016 |

* cited by examiner (a)

(b)

(a)

(b)

COMPOSITE SENSOR FOR SENSING GAS AND DUST BY USING SINGLE HEAT SOURCE

CROSS REFERENCE TO RELATED APPLICATIONS

This application is the National Phase of PCT International Application No. PCT/KR2016/009397, flied on Aug. 24, 2016, which claims priority under 35 U.S.C. 119(a) to Patent Application No. 10-2016-0081484, filed in the Republic of Korea on Jun. 29, 2016, all of which are hereby expressly incorporated by reference into the present application.

TECHNICAL FIELD

The present invention relates to a composite sensor for sensing gas and dust by driving a gas sensor and a dust sensor by using a single heat source, and an operating method thereof.

BACKGROUND ART

Infrared light is a part of an electromagnetic radiation spectrum and has a specific wavelength range from 0.75 μm to 1 mm. Gas molecules are composed of several atoms bonded together. These bonds always perform vibration and rotation having the respective natural frequencies. The frequencies of the vibration motion and the rotation motion have a functional relationship greatly affected by the size of the atoms and the bonding force. At this time, the natural frequency is derived from a mechanical wave due to an interatomic bond and a molecular structure, but is theoretically similar to an electromagnetic wave. The natural frequencies have different values due to the chemical molecular structures of gases and are always the same in a given molecule and a bonding structure. Therefore, the natural frequency characteristics appearing in gas constituents and molecular structures are used like individual fingerprints and provide a clue to identify a molecular structure of a given gas.

When infrared light emitted by an infrared light source lamp interacts with the gas molecules, a specific portion of an energy region band has a frequency equal to the natural frequency of the gas molecule and is absorbed while the infrared light of the other energy region is transmitted.

When the gas molecule absorbs infrared energy of a specific region having the same frequency, the molecule gains energy and vibrates more vigorously. Such vibration results in an increase in the temperature of the gas molecules, and the infrared light absorbed by the gas molecules loses the original intensity of the light source. At this time, the temperature increases in proportion to the gas concentration, and the light intensity decreases in inverse proportion to the gas concentration. The reduced radiant energy is sensed as an electrical signal.

A gas sensing method using infrared light can be divided into a dispersive infrared sensing method and a non-dispersive infrared sensing method. The dispersive infrared sensing method is used for qualitative analysis of gas compounds, and includes an infrared light source lamp, a slit selector and an optical mirror for analyzing various wavelengths, a prism, a gas sample cell with gratings, a detector, and an electronic amplifier. A curve for an absorption band and a wavelength of a compound can be obtained by changing a wavelength with time while scanning infrared light on a chemical compound. However, most equipment which uses this technology is stationary and is difficult to use for home or industrial use due to a large size.

The non-dispersive infrared sensing method measures a ratio of a degree of infrared light reaching a detector according to the presence or absence of gas to be measured in a gas sample. Therefore, quantitative analysis can be performed. A prism or a grating is not required so as to disperse the infrared light. Since a constituent device is simple, downsizing is possible as a sensor.

A non-dispersive infrared gas sensor (NDIR) includes: an infrared source which emits infrared light so as to pass through gas to be measured; an optical cavity including a reflector so that the emitted light can sufficiently react with the gas to be measured, without being dispersed to the outside in a mixed gas atmosphere; and an infrared detecting sensor (IR detecting sensor) which selectively detects a reduction amount of a specific wavelength range band among infrared light passing through a measurement gas atmosphere.

At this time, in order to manufacture a non-dispersive infrared gas sensor having excellent sensing characteristics, the optical path length must be long so as to increase the light absorption amount in the optical cavity, the light must be focused on the IR detecting sensor, and the sensitivity of the IR detecting sensor to the measurement wavelength region must be excellent.

Carbon dioxide in the atmosphere is very chemically stable gas in the atmosphere and is a main cause of global warming. Therefore, there is a growing need to adjust indoor air conditioning of buildings and carbon dioxide concentration in greenhouses for gardening as well as environmental issues.

An optical method (NDIR method) is the most widely used method for measuring the concentration of carbon dioxide gas present in the atmosphere. This method measures the concentration of carbon dioxide by measuring the absorption of infrared light by using the principle that carbon dioxide absorbs only infrared light of a specific wavelength.

This device has the advantages of excellent selectivity, quantitative characteristics, and reproducibility. However, the sealed space is required for measurement, and the physical sizes of the components and filters are large. Therefore, the device is very large in volume and is very heavy. In addition, since the driving part and the measuring element are very expensive and the configuration of the processing part for control is complicated, the overall cost of the measuring equipment is high. Therefore, although the applications are very diverse, it has not been widely used. In particular, when exposed to a harsh environment, the optical system is easily contaminated, and thus there is a disadvantage that the use range is limited to the room.

As another method for measuring the carbon dioxide concentration, a semiconductor type gas sensor using a semiconductor compound such as $SnO_2$ or $TiO_2$ is used. This is a principle of measuring the concentration of gas through a change in resistance that appears when gas particles are adsorbed on the surface of a semiconductor compound. Although there is an advantage in that a small-sized sensor can be manufactured, there is a disadvantage in that gas selectivity is remarkably deteriorated since it is difficult to distinguish different types of gas particles that are adsorbed.

On the other hand, a gas sensor using a solid electrolyte has a simple structure, and a sensor can be manufactured in a small device type. Since a sensing electrode selectively sensing only a specific gas is used, gas selectivity can be enhanced and quantitative measurement of gas concentration can be performed. In addition, since it is not only inexpensive but also uses oxides, it can be stably used in extreme environments.

A dust sensor is a device that purifies contaminated air and converts the contaminated air into fresh air in an air conditioning system such as an air purifier. The contaminated air is sucked by a fan, fine dust or bacteria is collected by a filter, and a body odor or cigarette smell is deodorized. In addition, when the concentration and size of dusts contained in the indoor air are detected, it is determined whether to start the operation of the air conditioner system according to the degree of the concentration and the size. The fan rotation speed is controlled based on the determination. Therefore, it is possible to appropriately purify the contaminated indoor air, thereby enabling efficient operation.

DISCLOSURE OF THE INVENTION

Technical Problem

An object of the present invention is to provide a low power composite sensor which uses a single heat source to drive a gas sensor and a dust sensor.

Another object of the present invention is to provide a small-sized composite sensor in which a gas sensor and a dust sensor are configured as one usage package through a single heat source.

Further another object of the present invention is to provide a small-sized composite sensor in which an electrochemical gas sensor is driven in a dust sensor.

Technical Solution

In one embodiment, a composite sensor for sensing gas and dust by using a single heat source includes: a base; a gas sensor module including a gas sensor and a first light source in a first space; a dust sensor module including a dust sensor, a lens, and a second light source in a second space; and a heat transfer wall configured to transfer heat generated by the first light source to the dust sensor module.

In the composite sensor sensing gas and dust by using a single heat source according to one embodiment, the heat transfer wall is formed as a projection of the base, is disposed at an opening of the dust sensor module, closes an opened surface of the gas sensor module, and shields the first space and the second space.

In the composite sensor sensing gas and dust by using a single heat source according to one embodiment, the heat transfer wall is formed as a protrusion of the base and is in contact with one sidewall of the gas sensor module and one sidewall of the dust sensor module.

In the composite sensor sensing gas and dust by using a single heat source according to one embodiment, the heat transfer wall is formed on one sidewall of the dust sensor module, is coupled to an upper surface of the base, closes an opened surface of the gas sensor module, and shields the first space.

In the composite sensor sensing gas and dust by using a single heat source according to one embodiment, the heat transfer wall is formed on one sidewall of the gas sensor module, is coupled to an upper surface of the base, closes an opened surface of the dust sensor module, and shields the second space.

In the composite sensor sensing gas and dust by using a single heat source according to one embodiment, the gas sensor module includes a first housing, and the first housing and the base are coupled to each other to form the first space, and the first housing includes a gas inlet through which gas is introduced on one sidewall, and a gas outlet through which gas is discharged on another sidewall.

In the composite sensor sensing gas and dust by using a single heat source according to one embodiment, the gas sensor module further includes a concave mirror in the first space, and the concave mirror transfers light emitted from the first light source toward the gas sensor.

In the composite sensor sensing gas and dust by using a single heat source according to one embodiment, the dust sensor module includes a second housing, and the second housing and the base are coupled to each other to form the second space, and the second housing includes a dust inlet through which dust is introduced on one sidewall, and a dust outlet through which dust is discharged on another one sidewall.

In the composite sensor sensing gas and dust by using a single heat source according to one embodiment, the dust sensor senses dusts of a predetermined size or more among dusts moving in the second space, and the dusts moving in the second space moves to the dust outlet due to heat transferred from the heat transfer wall.

Advantageous Effects

The present invention may have the following effects.

According to one embodiment among various embodiments of the present invention, there is an advantage that can provide a low power composite sensor which uses a single heat source to drive a gas sensor and a dust sensor.

According to another object among various embodiments of the present invention, there is a technical effect that provides a small-sized composite sensor in which a gas sensor and a dust sensor are configured as one usage package through a single heat source.

According to further another object among various embodiments of the present invention, there is a technical effect that provides a small-sized composite sensor in which an electrochemical gas sensor is driven in a dust sensor.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

Figure 1:
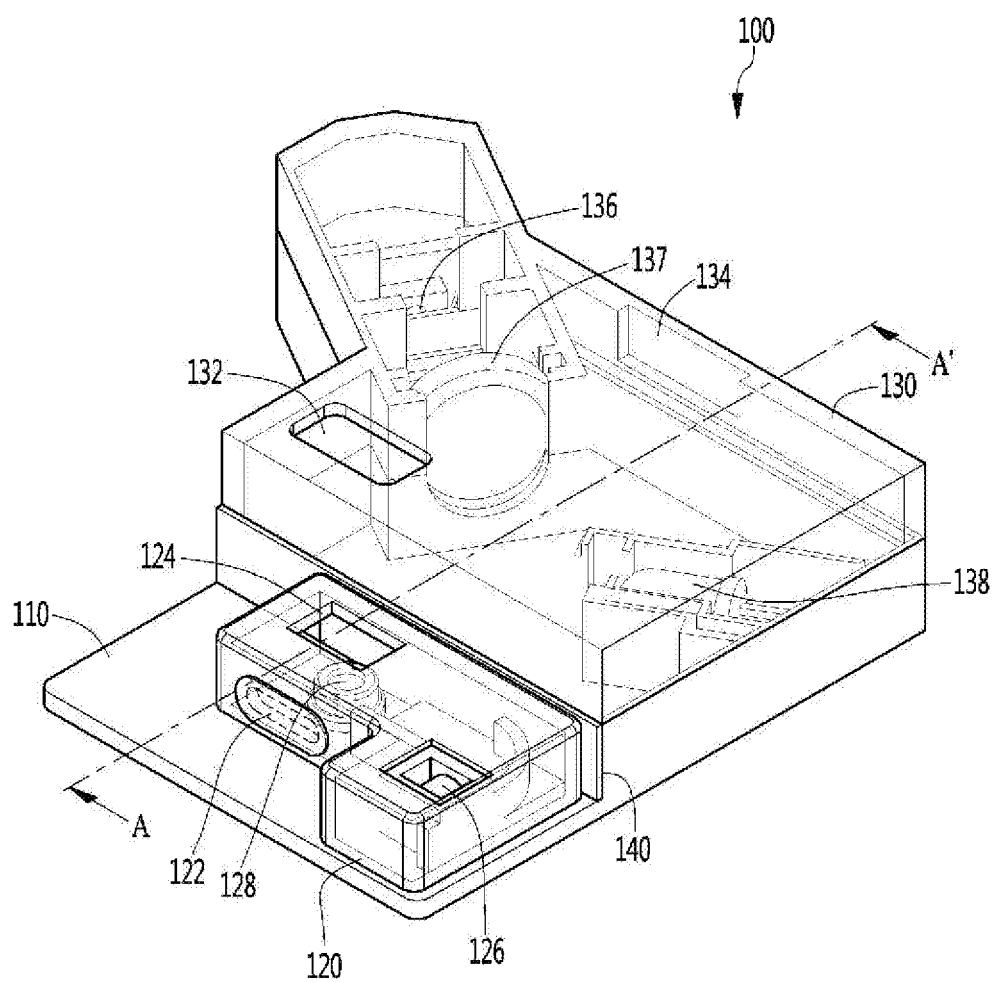
FIG. 1 is a perspective view illustrating an overall configuration of a composite sensor according to an embodiment of the present invention.

FIG. 1 is a perspective view illustrating an overall configuration of a composite sensor according to an embodiment of the present invention.

As illustrated in FIG. 1, a composite sensor 100 according to an embodiment of the present invention may include a base 110, a gas sensor module 120, a dust sensor module 130, and a heat transfer wall 140. That is, as illustrated in FIG. 1, since the composite sensor 100 includes both the gas sensor module 120 and the dust sensor module 130, the composite sensor 100 may sense the gas and the dust at the same time.

In the case of the gas sensor module 120 included in the composite sensor 100 according to the embodiment of the present invention, gas such as carbon dioxide may be sensed by using a gas sensor. The gas sensor module 120 includes a first housing, and the first housing and the base 110 may be coupled to each other to form a first space. The gas sensor module 120 may include a first light source 126 and a gas sensor 128 in the first space. The first light source 126 and the gas sensor 128 may be coupled to one region in the upper surface of the base 110. The first housing of the gas sensor module 120 may include a gas inlet 122 through which gas flows in on one sidewall, and a gas outlet 124 through which gas flows out on the other sidewall. Furthermore, the gas sensor module 120 may further include a concave mirror in the first space, and the concave mirror may transfer light emitted from the first light source 126 of the gas sensor module 120 toward the gas sensor 128. The gas sensor module 120 included in the composite sensor 100 according to the embodiment of the present invention may be a non-dispersive infrared gas sensor (NDIR).

In the case of the dust sensor module 130 included in the composite sensor 100 according to the embodiment of the present invention, it is possible to sense dusts of a predetermined type and a predetermined size or more by using a dust sensor. The dust sensor module 130 includes a second housing, and the second housing and the base 110 may be coupled to each other to form a second space. The dust sensor module 130 may include a dust sensor 136, a lens 137, and a second light source 138 in the second space. The second light source 138 and the dust sensor 136 may be coupled to one region in the upper surface of the base 110. The second housing of the dust sensor module 130 may include a dust inlet 132 through which dust flows in on one sidewall, and a dust outlet 134 through which dust flows out on the other sidewall. Therefore, when the dusts flowing in through the dust inlet 132 are introduced into a predetermined region, the dust sensor 136 may sense dusts through a scattering process with light emitted from the second light source 138. In addition, the dust flowing in through the dust inlet 132 may be moved to the dust outlet 134 by heat transferred from the heat transfer wall 140.

In the case of the heat transfer wall 140 included in the composite sensor 100 according to the embodiment of the present invention, the heat generated from the first light source 126 of the gas sensor module 120 may be transferred to the dust sensor module 130. The heat transfer wall 140 may be implemented in various forms. The heat transfer wall 140 may be formed as a protrusion of the base 110, may be positioned at an opening of the dust sensor module 130, and may close an opened surface of the gas sensor module 120 and shield the first space and the second space. As another example, the heat transfer wall 140 may be formed as a protrusion of the base 110, and may be formed to be in contact with one sidewall of the gas sensor module 120 and one sidewall of the dust sensor module 130. As further another example, the heat transfer wall 140 may be formed on one sidewall of the dust sensor module 130, may be coupled to the upper surface of the base 110, and may be configured to close the opened surface of the gas sensor module 120, or the heat transfer wall 140 may be formed on one sidewall of the gas sensor module 120, may be coupled to the upper surface of the base 110, and may close the opening of the dust sensor module 130. The various forms of the heat transfer wall 140 will be described in detail with reference to FIGS. 3 to 6.

Figure 2:
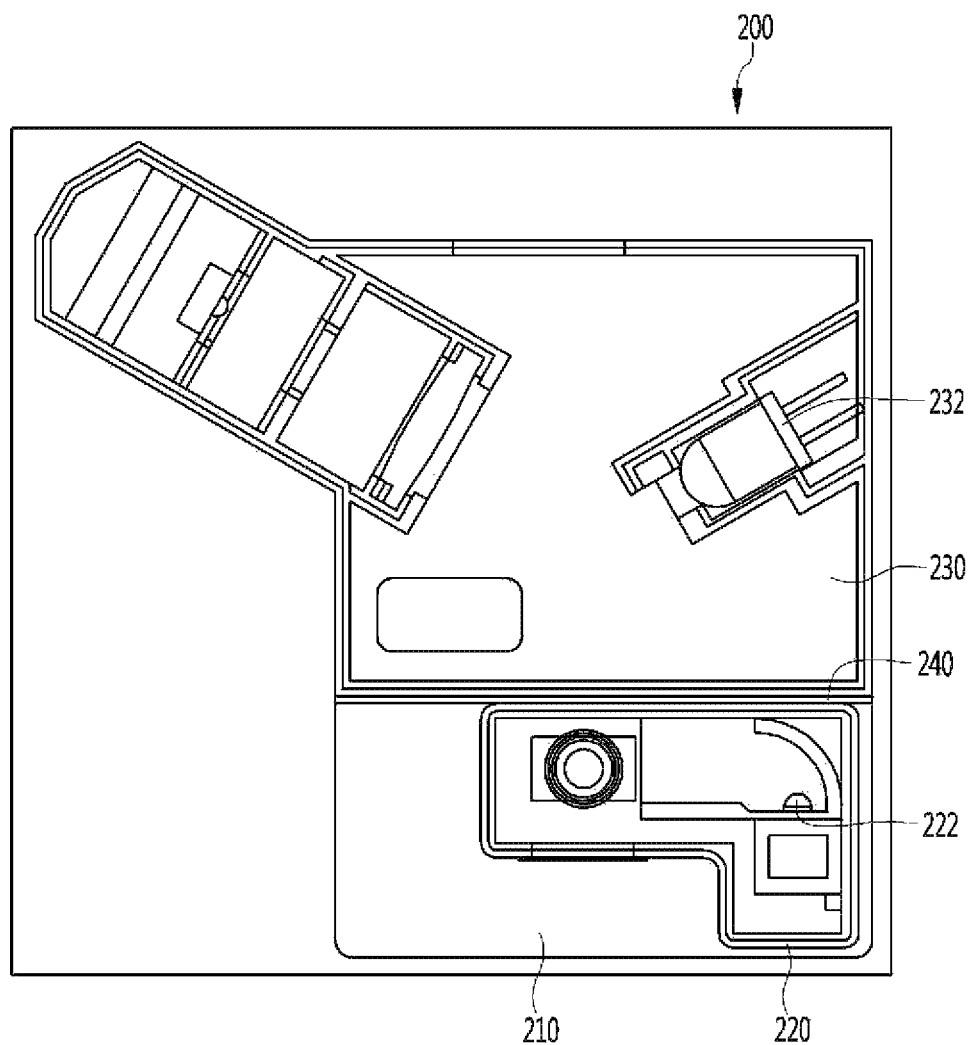
FIG. 2 is a plan view illustrating the overall configuration of the composite sensor according to the embodiment of the present invention.

FIG. 2 is a plan view illustrating an overall configuration of a composite sensor according to an embodiment of the present invention.

As illustrated in FIG. 2, the composite sensor 200 according to an embodiment of the present invention may include a base 210, a gas sensor module 220, a dust sensor module 230, and a heat transfer wall 240. That is, as illustrated in FIG. 2, since the composite sensor 200 includes both the gas sensor module 220 and the dust sensor module 230, the composite sensor 200 may sense the gas and the dust at the same time. As described above with reference to FIG. 1, the gas sensor module 220 of the composite sensor 200 according to the exemplary embodiment of the present invention may include a first light source 222, and the dust sensor module 230 may include a second light source 232. The gas sensor module 220 may sense gas by using light emitted from the first light source 222, and heat generated from the first light source 222 may be transferred through the heat transfer wall 240 to the second space in the dust sensor module 230. Heat transferred through the heat transfer wall 240 to the second space may convect the dust upward. The dust sensor module 230 may sense dusts by detecting a light scattering process caused when the dusts convected by the heat transferred through the heat transfer wall 240 meet the light emitted from the second light source 232

By designing the composite sensor as illustrated in FIGS. 1 and 2, a designer may remove a separate heat source for convecting dusts in a conventional dust sensor module, and the light source included in the gas sensor module may be used as a heat source. Therefore, it is possible to reduce power consumption and reduce the size of the sensor.

Figure 3:
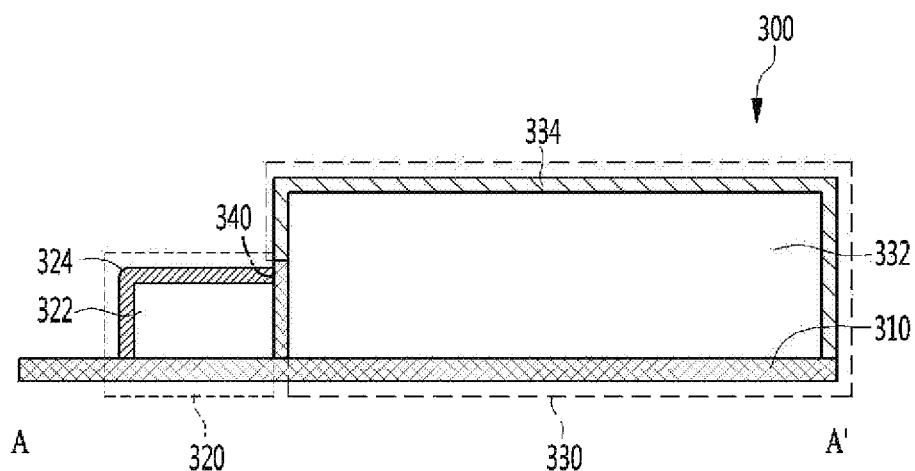
FIG. 3 is a cross-sectional view illustrating a heat transfer wall structure of a composite sensor according to a first embodiment of the present invention.

FIG. 3 is a cross-sectional view illustrating a heat transfer wall structure of a composite sensor according to a first embodiment of the present invention. FIG. 3 is a cross-sectional view of line AA' in FIG. 1.

As illustrated in FIG. 3, a composite sensor 300 according to a first embodiment of the present invention may include a base 310, a gas sensor module 320, a dust sensor module 330, and a heat transfer wall 340. The heat transfer wall 340 of the composite sensor 300 according to the first embodiment of the present invention may be formed as a protrusion of the base 310. In addition, the heat transfer wall 340 of the composite sensor 300 according to the first embodiment of the present invention may be positioned at the opening of the dust sensor module 330. In addition, the heat transfer wall 340 of the composite sensor 300 according to the first embodiment of the present invention may close the opened surface of the gas sensor module 320. Furthermore, the heat transfer wall 340 of the composite sensor 300 according to the first embodiment of the present invention may shield the first space 322 and the second space 332.

As illustrated in FIG. 3, the heat transfer wall 340 of the composite sensor 300 according to the first embodiment of the present invention may be formed as a protrusion of the base 310. One surface of the first housing 324 of the gas sensor module 320 may be coupled to the upper surface of the base 310. Another surface of the first housing 324 may be coupled to one surface of the heat transfer wall 340. The first housing 324 may be coupled to the base 310 and the heat transfer wall 340 to form the first space 322. As described above with reference to FIG. 1, a gas sensor, a first light source, and the like may be included in the first space 322. In addition, the heat transfer wall 340 of the composite sensor 300 according to the first embodiment of the present invention may be formed as the protrusion of the base 310. One surface of the second housing 334 of the dust sensor module 330 may be coupled to the upper surface of the base 310. Another surface of the second housing 334 may be coupled to the upper surface of the heat transfer wall 340. The second housing 334 may be coupled to the base 310 and the heat transfer wall 340 to form the second space 332. As described above with reference to FIG. 1, a dust sensor, the lens, a second light source, and the like may be included in the second space 332.

Figure 4:
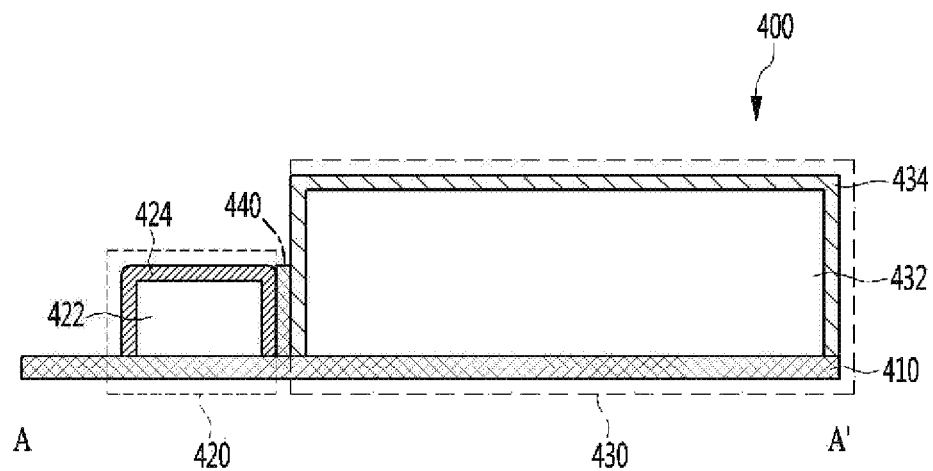
FIG. 4 is a cross-sectional view illustrating a heat transfer wall structure of a composite sensor according to a second embodiment of the present invention.

FIG. 4 is a cross-sectional view illustrating a heat transfer wall structure of a composite sensor according to a second embodiment of the present invention. FIG. 4 is a cross-sectional view of line AA' in FIG. 1.

As illustrated in FIG. 4, a composite sensor 400 according to a second embodiment of the present invention may include a base 410, a gas sensor module 420, a dust sensor module 430, and a heat transfer wall 440. The heat transfer wall 440 of the composite sensor 400 according to the second embodiment of the present invention may be formed as a protrusion of the base 410. The heat transfer wall 440 of the composite sensor 400 according to the second embodiment of the present invention may be in contact with one sidewall of the gas sensor module 420 and one sidewall of the dust sensor module 430.

As illustrated in FIG. 4, the heat transfer wall 440 of the composite sensor 400 according to the second embodiment of the present invention may be formed as a protrusion of the base 410. The lower surface of the first housing 424 of the gas sensor module 420 may be coupled to the upper surface of the base 410. The first housing 424 may be coupled to the base 410 to form a first space 422. As described above with reference to FIG. 1, a gas sensor, a first light source, and the like may be included in the first space 422. In addition, the heat transfer wall 440 of the composite sensor 400 according to the second embodiment of the present invention may be formed as a protrusion of the base 410. The lower surface of the second housing 434 of the dust sensor module 430 may be coupled to the upper surface of the base 410. The second housing 434 may be coupled to the base 410 to form a second space 432. As described above with reference to FIG. 1, a dust sensor, the lens, a second light source, and the like may be included in the second space 432.

Figure 5:
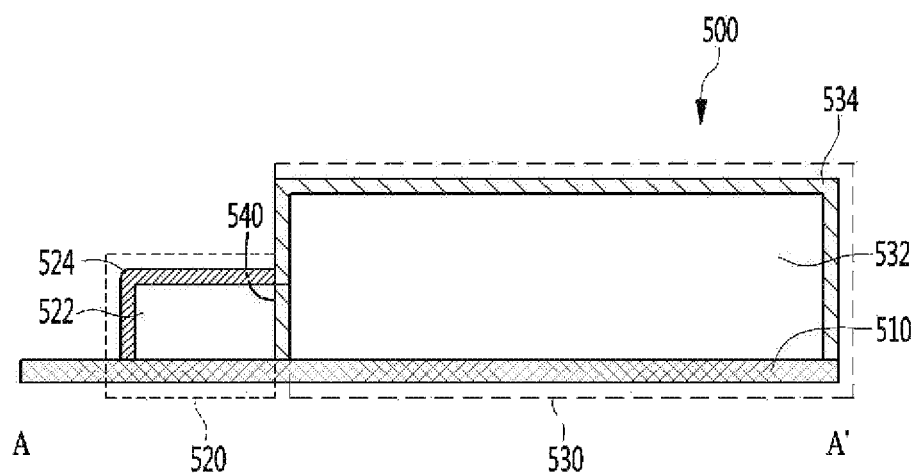
FIG. 5 is a cross-sectional view illustrating a heat transfer wall structure of a composite sensor according to a third embodiment of the present invention.

FIG. 5 is a cross-sectional view illustrating a heat transfer wall structure of a composite sensor according to a third embodiment of the present invention. FIG. 5 is a cross-sectional view of line AA' in FIG. 1.

As illustrated in FIG. 5, a composite sensor 500 according to a third embodiment of the present invention may include a base 510, a gas sensor module 520, a dust sensor module 530, and a heat transfer wall 540. The heat transfer wall 540 of the composite sensor 500 according to the third embodiment of the present invention may be formed on one sidewall of the dust sensor module 530. In addition, the lower surface of the heat transfer wall 540 of the composite sensor 500 according to the third embodiment of the present invention may be coupled to the upper surface of the base 510. In addition, the heat transfer wall 540 of the composite sensor 500 according to the third embodiment of the present invention may close the opened surface of the gas sensor module 520. The first space 522 may be shielded by closing the opened surface of the gas sensor module 520.

As illustrated in FIG. 5, the heat transfer wall 540 of the composite sensor 500 according to the third embodiment of the present invention may be formed on one sidewall of the dust sensor module 530. The lower surface of the second housing 534 of the dust sensor module 530 may be coupled to the upper surface of the base 510. The lower surface of the second housing 534 may be coupled to the upper surface of the base 510 to form a second space 532. One surface of the first housing 524 of the gas sensor module 520 may be coupled to the upper surface of the base 510. Another surface of the housing 524 of the gas sensor module 520 may be coupled to one surface of the second housing 534. The first housing 524 may be coupled to the base 510 and the second housing 534 to form a first space 522 In addition, the heat transfer wall 540 of the composite sensor 500 according to the third embodiment of the present invention may be formed as a part of the second housing 534. In one sidewall of the second housing 534, a wall below a portion in which the first housing 524 and the second housing 534 are coupled may be the heat transfer wall 540.

Figure 6:
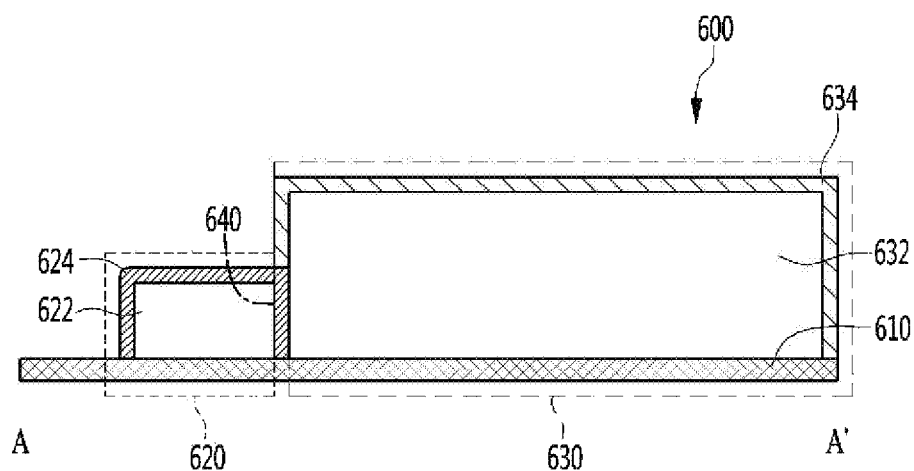
FIG. 6 is a cross-sectional view illustrating a heat transfer wall structure of a composite sensor according to a fourth embodiment of the present invention.

FIG. 6 is a cross-sectional view illustrating a heat transfer wall structure of a composite sensor according to a fourth embodiment of the present invention. FIG. 6 is a cross-sectional view of line AA' in FIG. 1.

As illustrated in FIG. 6, a composite sensor 600 according to a fourth embodiment of the present invention may include a base 610, a gas sensor module 620, a dust sensor module 630, and a heat transfer wall 640. The heat transfer wall 640 of the composite sensor 600 according to the fourth embodiment of the present invention may be formed on one sidewall of the gas sensor module 620. In addition, the lower surface of the heat transfer wall 640 of the composite sensor 600 according to the fourth embodiment of the present invention may be coupled to the upper surface of the base 610. In addition, the heat transfer wall 640 of the composite sensor 600 according to the fourth embodiment of the present invention may close the opening of the dust sensor module 630. A second space 632 may be shielded by closing the opening of the dust sensor module 630.

As illustrated in FIG. 6, the heat transfer wall 640 of the composite sensor 600 according to the fourth embodiment of the present invention may be formed on one sidewall of the gas sensor module 620. The lower surface of the first housing 624 of the gas sensor module 620 may be coupled to the upper surface of the base 610. The lower surface of the first housing 624 may be coupled to the upper surface of the base 610 to form a first space 622. One surface of the second housing 634 of the dust sensor module 630 may be coupled to the upper surface of the base 610. Another surface of the housing 634 of the dust sensor module 630 may be coupled to one surface of the first housing 624. The second housing 634 may be coupled to the base 610 and the first housing 624 to form a second space 632 The heat transfer wall 640 of the composite sensor 600 according to the fourth embodiment of the present invention is formed on one sidewall of the first housing 624, and the upper surface of the heat transfer wall 640 can be coupled to one surface of the second housing 634.

As illustrated in FIGS. 3 to 6, the composite sensor of the present invention may include various types of heat transfer walls. The heat generated from the first light source in the first space can be transferred to the second space, regardless of the type of the heat transfer wall.

Figure 7:
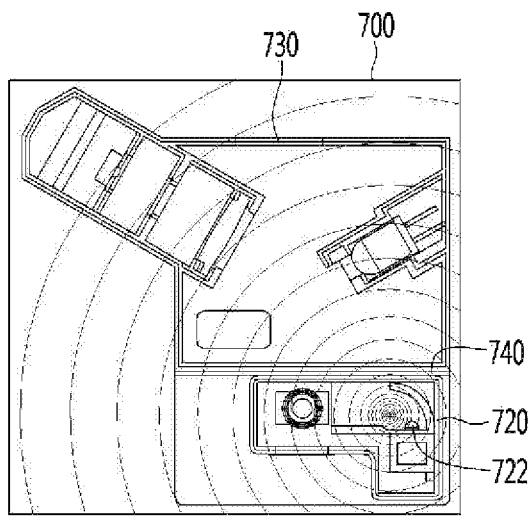
FIG. 7 is a view for describing an example in which heat generated by a first light source in a first space is transferred to a second space through a heat transfer wall in a composite sensor according to an embodiment of the present invention.
Figure 7:
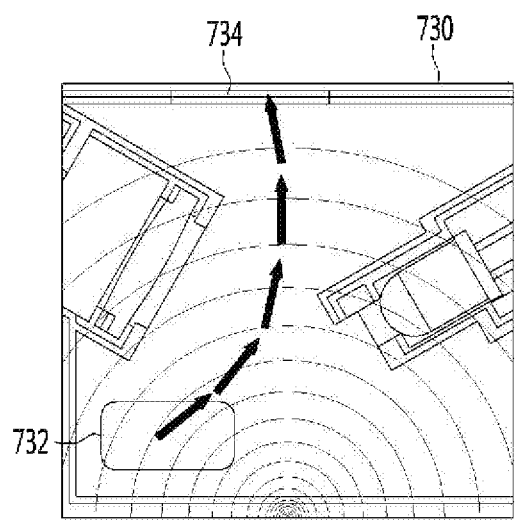

FIG. 7 is a view for describing an example in which heat generated by a first light source in a first space is transferred to a second space through a heat transfer wall in a composite sensor according to an embodiment of the present invention.

As illustrated in FIG. 7(a), a composite sensor 700 according to an embodiment of the present invention may include a gas sensor module 720, a dust sensor module 730, and a heat transfer wall 740. The gas sensor module 720 may include a first light source 722, and the first light source 722 may generate heat as well as light. The temperature of the first space of the gas sensor module 720 may increase due to the heat generated by the first light source 722. While the temperature of the first space increases, the heat of the first space may be transferred to the second space of the dust sensor module 730 through the heat transfer wall 740.

As illustrated in FIG. 7(b), dusts introduced through a dust inlet 732 of the dust sensor module 730 due to the heat transferred to the second space through the heat transfer wall 740 may move toward a dust outlet 734.

In a conventional dust sensor module, a separate heat source is required in the dust sensor module so as to move the dusts introduced through the dust inlet to the dust outlet. However, when designing as illustrated in FIG. 7, both the gas sensor module and the dust sensor module may be driven while using only one heat source, and no separate heat source is required in the dust sensor module. Therefore, the technical effect of reducing power consumption and miniaturizing the sensor module may be achieved.

Figure 8:
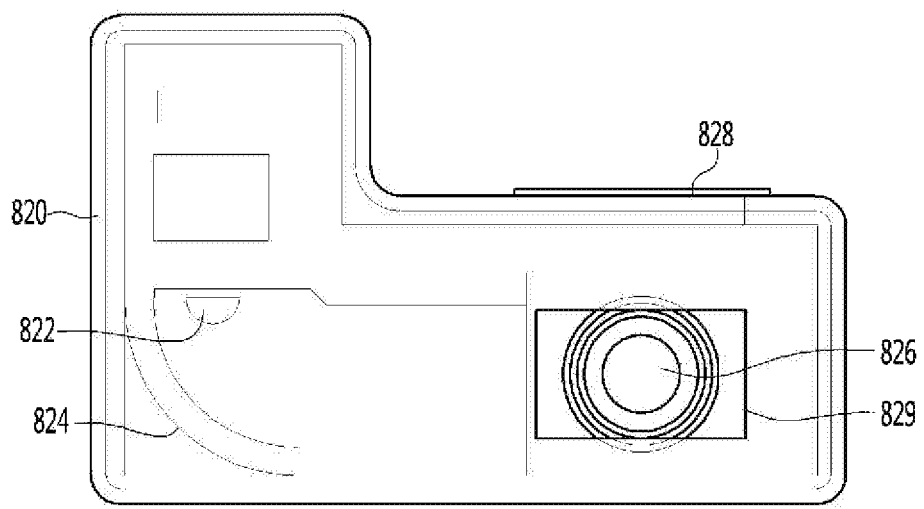
FIG. 8 is a view for describing a configuration of a gas sensor module included in a composite sensor according to an embodiment of the present invention.
Figure 8:
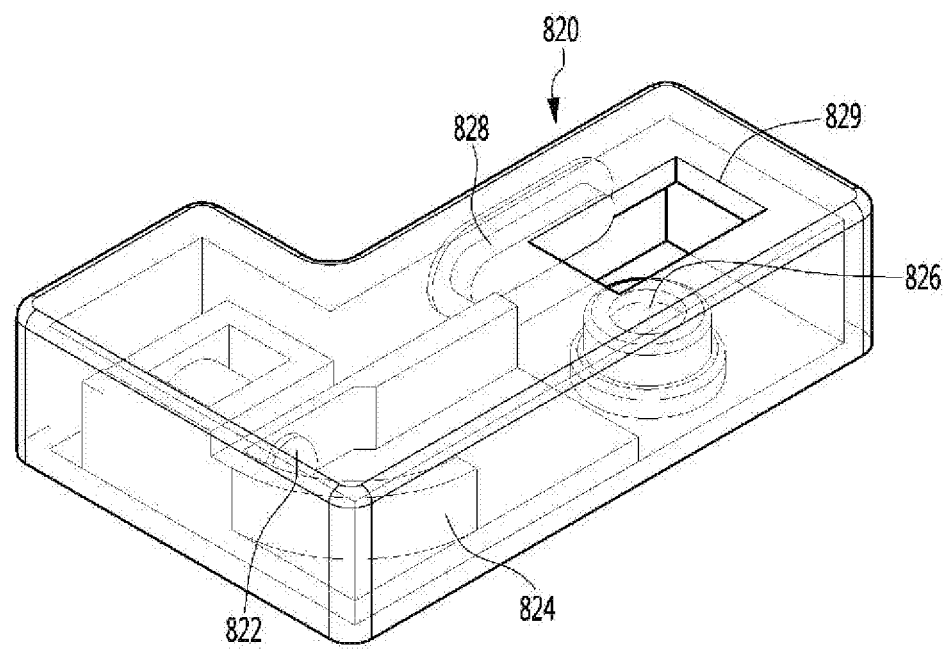

FIG. 8 is a view for describing a configuration of a gas sensor module included in a composite sensor according to an embodiment of the present invention.

As illustrated in FIGS. 8(a) and 8(b), a gas sensor module 820 included in a composite sensor according to an embodiment of the present invention may include a first light source 822, a concave mirror 824, a gas sensor 826, a gas inlet 828, and a gas outlet 829. First, the gas sensor included in the composite sensor according to the embodiment of the present invention may be an NDIR gas sensor. Although not illustrated in FIG. 8, the gas sensor module 820 may further include an optical waveguide as well as the first light source 822 and the gas sensor 826. In the case of the first light source 822, an incandescent lamp is generally used, and details thereof will be described in detail with reference to FIG. 9. The concave mirror 824 serves to transfer light emitted from the first light source 822 toward the gas sensor 826, and the gas sensor 826 may detect infrared light that reacts to a specific gas among gases that are introduced through the gas inlet 828 and discharged through the gas outlet 829. FIG. 8 illustrates an NDIR gas sensor module among the gas sensor modules included in the composite sensor. Gas sensor modules other than the NDIR gas sensor module may be used in the composite sensor of the present invention.

Figure 9:
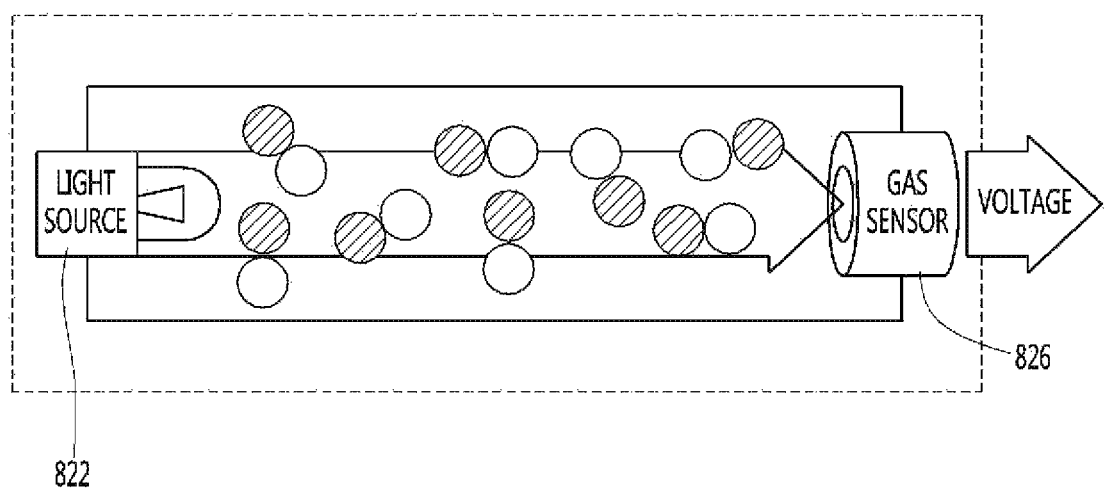
FIG. 9 is a view for describing an example of detecting light in a gas sensor module of a composite sensor according to an embodiment of the present invention.

FIG. 9 is a view for describing an example of detecting light in a gas sensor module of a composite sensor according to an embodiment of the present invention.

The first light source 822 of the gas sensor module 820 of FIG. 8 may include an incandescent lamp and any light sources having the same light emission characteristics as those of the incandescent lamp. In the incandescent lamp, the brightness of the light increases as a pattern of a growth curve over a certain natural time in the process of emitting light when a current is applied to a filament. This pattern is determined by the intensity of the applied current and voltage and the physical properties of the filament. Here, the physical properties of filament may be collectively referred to as electric conductivity, thermal conductivity, and thermal properties of gas filled in a bulb. When the incandescent lamp is driven by applying power thereto, it takes a certain time to reach the maximum brightness. Thus, the brightness of the incandescent lamp has a pattern of a growth curve for the time when the incandescent lamp reaches the maximum brightness. Parameters included in a function representing the growth curve include a parameter including the amount of voltage or current of the applied power and a parameter including the physical properties of the filament. Generally, these functions are driven through theoretical analysis, but even if theoretical analysis is impossible, appropriate functions may be found from existing similar functions, and the parameters of these functions are mutually independent.

Figure 10:
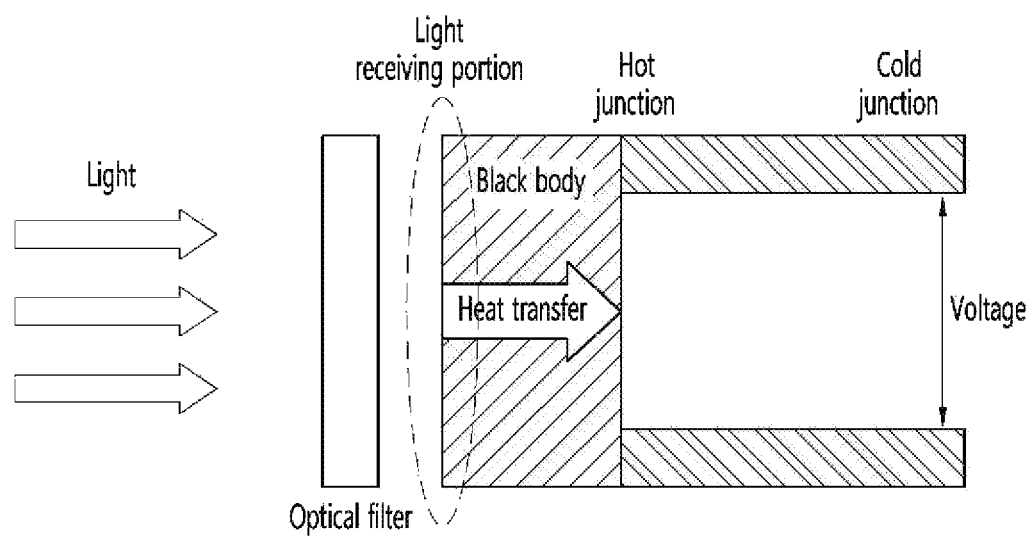
FIG. 10 is a view for describing a principle of a gas sensor of a gas sensor module of a composite sensor according to an embodiment of the present invention.

FIG. 10 is a view for describing a principle of a gas sensor of a gas sensor module of a composite sensor according to an embodiment of the present invention.

The gas sensor 826 of the gas sensor module 820 illustrated in FIG. 8 may be a thermopile. The thermopile detects light by using a thermoelectric effect. Such a thermopile is a sensor that has a black body in a light receiving portion, absorbs light to raise the temperature, and generates a voltage by a temperature difference caused thereby. In addition, since the black body absorbs light regardless of the wavelength of the light, an optical filter having transmission characteristics of the corresponding wavelength band is disposed in front of the light receiving portion so as to detect only light of a specific wavelength. The light reaching the light receiving portion of the black body heats the black body, and the heat thus heated is transferred to a hot junction. The transfer does not progress in an instant but occurs with a certain time delay. Therefore, a voltage generated at a cold junction increases over a certain time, and the increase in voltage has a pattern of a growth curve. As a result, the voltage output from the gas sensor 826 may be the sum of the light emission pattern of the first light source 822 and the light reception pattern of the gas sensor 826, and it can be said that the pattern has a growth curve.

Figure 11:
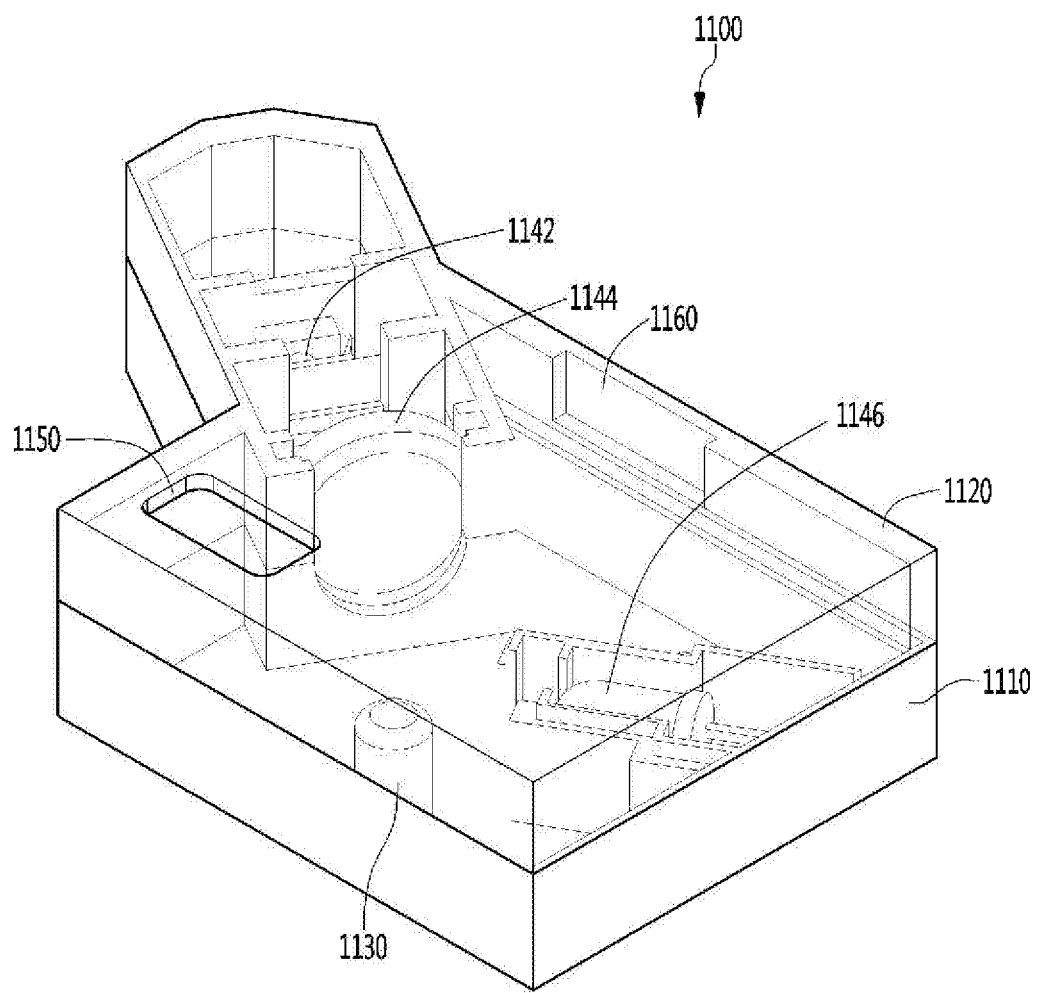
FIG. 11 is a perspective view illustrating an overall configuration of a composite sensor according to another embodiment of the present invention.

FIG. 11 is a perspective view illustrating an overall configuration of a composite sensor according to another embodiment of the present invention.

A composite sensor 1100 according to another embodiment of the present invention may include: a base 1110; a housing 1120 coupled to the upper surface of the base 1110 to form a space; a gas sensor 1130 coupled to the upper surface of the base 1110 in the space and including a solid electrolyte, a reference electrode, and a sensing electrode; and a dust sensor 1142, a lens 1144, and a light source 1146 coupled to the upper surface of the base 1110 in the space. The gas sensor 1130 emits heat during operation. The dust sensor 1142 senses dusts of a predetermined size or more among the dusts moved by the heat emitted from the gas sensor 1130. The housing 1120 may include a first opening 1150 through which gas and dust are introduced on one sidewall and a second opening 1160 through which gas and dust are discharged on another sidewall.

Unlike the composite sensor 100 described above with reference to FIG. 1, the composite sensor 1100 of FIG. 11 may use an electrochemical gas sensor 1130 as a gas sensor, instead of an NDIR gas sensor. In addition, since the gas sensor 1130 continues to emit heat during operation, the dusts introduced into the first opening 1150 may be convected to the second opening 1160 by heat. Since the composite sensor 1100 of FIG. 11 uses the electrochemical gas sensor instead of the NDIR gas sensor, the first light source 126 of FIG. 1 is not required, and the gas sensor 1130 itself may be disposed in one space with the dust sensor 1142. As a result, there is a technical effect that can reduce the size of the composite sensor as a whole and can greatly reduce power consumption.

In addition, the dusts introduced into the first opening 1150 may be moved to the second opening 1160 by the heat emitted from the gas sensor 1130.

In addition, the lens 1144 may collect scattered light generated by the collision of the light generated by the light source 1146 and the dusts in the space.

In addition, the gas sensor 1130 may be disposed between the light source 1146 and the lens 1144 in the space.

In addition, the dust sensor 1142 may sense dusts passing through a focusing part in the space, and the heat emitted from the gas sensor 1130 may guide the dusts in the space to the focusing part.

Furthermore, a filter for blocking dusts of a predetermined size or more may be installed in the first opening 1150.

Figure 12:
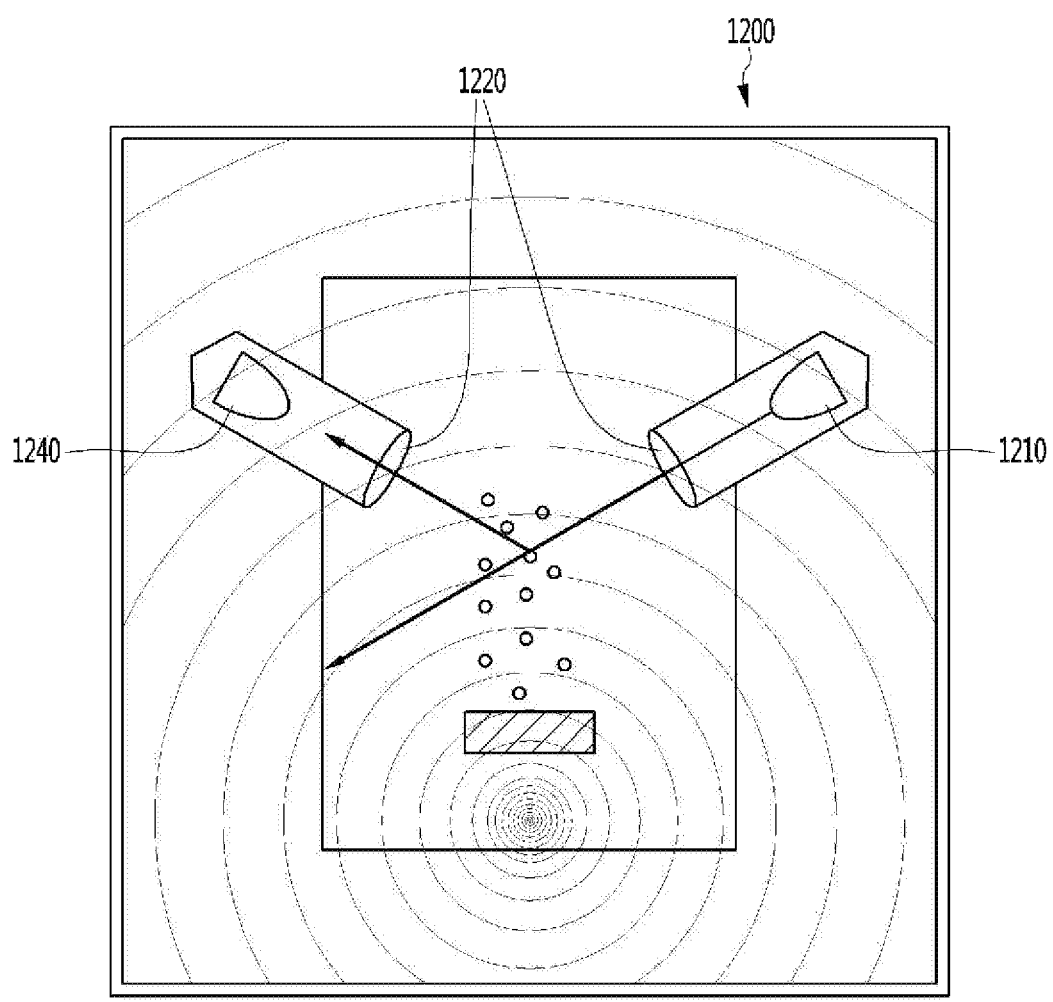
FIG. 12 is a view for describing a configuration of a dust sensor module included in a composite sensor according to an embodiment of the present invention.

FIG. 12 is a view for describing a configuration of a dust sensor included in a composite sensor according to an embodiment of the present invention.

The dust sensor included in the composite sensor according to the embodiment of the present invention uses the scattering of light. When the light emitted from the light source (for example, LED) 1210 is irradiated through the lens 1220 to the illumination area, dust particles rise due to heat transferred from the lower portion of the sensor, and light is scattered in proportion to the dust size when the rising dust particles pass through the illumination area. The light receiving portion 1240 receives light scattered by the dust particles through the lens 1220, and sense dusts by generating scattered light pulses proportional to the intensity of the received scattered light.

The composite sensors described above are not limited to the configurations and methods of the above-described embodiments, and the embodiments may be constructed by selectively combining all or part of the embodiments so that various modifications can be made thereto.

The invention claimed is:

1. A composite sensor for sensing gas and dust by using a single heat source, the composite sensor comprising:
    a base;
    a gas sensor module comprising a gas sensor and a first light source in a first space;
    a dust sensor module comprising a dust sensor, a lens, and a second light source in a second space; and
    a heat transfer wall configured to transfer heat generated by the first light source to the dust sensor module,
    wherein the heat transfer wall is formed as a protrusion of the base and is in contact with one sidewall of the gas sensor module and one sidewall of the dust sensor module.

2. A composite sensor for sensing gas and dust by using a single heat source, the composite sensor comprising:
    a base;
    a gas sensor module comprising a gas sensor and a first light source in a first space;
    a dust sensor module comprising a dust sensor, a lens, and a second light source in a second space; and
    a heat transfer wall configured to transfer heat generated by the first light source to the dust sensor module,
    wherein the heat transfer wall is formed as a projection of the base, is disposed at an opening of the dust sensor module, closes an opened surface of the gas sensor module, and shields the first space and the second space.

3. A composite sensor for sensing gas and dust by using a single heat source, the composite sensor comprising:
    a base;
    a gas sensor module comprising a gas sensor and a first light source in a first space;
    a dust sensor module comprising a dust sensor, a lens, and a second light source in a second space; and
    a heat transfer wall configured to transfer heat generated by the first light source to the dust sensor module,
    wherein the heat transfer wall is formed on one sidewall of the dust sensor module, is coupled to an upper surface of the base, closes an opened surface of the gas sensor module, and shields the first space.

4. The composite sensor according to claim 1, wherein the heat transfer wall is formed on the one sidewall of the gas sensor module, is coupled to an upper surface of the base, and closes an opening of the dust sensor module.

5. The composite sensor according to claim 1, wherein the gas sensor module comprises a first housing, and the first housing and the base are coupled to each other to form the first space, and
    the first housing comprises a gas inlet through which gas is introduced on one sidewall, and a gas outlet through which gas is discharged on another sidewall.

6. The composite sensor according to claim 5, wherein the gas sensor module further comprises a concave mirror in the first space, and
    the concave mirror transfers light emitted from the first light source toward the gas sensor.

7. The composite sensor according to claim 1, wherein the dust sensor module comprises a second housing, and the second housing and the base are coupled to each other to form the second space, and
    the second housing comprises a dust inlet through which dust is introduced on one sidewall, and a dust outlet through which dust is discharged on another one sidewall.

8. The composite sensor according to claim 7, wherein the dust sensor senses dusts of a predetermined size or more among dusts moving in the second space, and
    the dusts moving in the second space moves to the dust outlet due to heat transferred from the heat transfer wall.

* * * * *